United States Patent
Chang et al.

(10) Patent No.: US 12,470,465 B2
(45) Date of Patent: Nov. 11, 2025

(54) CONTINUOUSLY IMPROVING API SERVICE ENDPOINT SELECTIONS VIA ADAPTIVE REINFORCEMENT LEARNING

(71) Applicant: INTERNATIONAL BUSINESS MACHINES CORPORATION, Armonk, NY (US)

(72) Inventors: Rong Nickle Chang, Pleasantville, NY (US); Hongyi Bian, Ames, IA (US); Nitin Gaur, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/959,665

(22) Filed: Oct. 4, 2022

(65) Prior Publication Data
US 2024/0113945 A1    Apr. 4, 2024

(51) Int. Cl.
*H04L 41/16* (2022.01)
*H04L 41/0246* (2022.01)
*H04L 43/55* (2022.01)

(52) U.S. Cl.
CPC .......... *H04L 41/16* (2013.01); *H04L 41/0246* (2013.01); *H04L 43/55* (2022.05)

(58) Field of Classification Search
CPC ...... H04L 41/16; H04L 41/0246; H04L 43/55
See application file for complete search history.

(56) References Cited

U.S. PATENT DOCUMENTS

| | | | | |
|---|---|---|---|---|
| 10,985,987 B2* | 4/2021 | Imperia | .................. | G06F 11/30 |
| 11,095,534 B1* | 8/2021 | Dunsmore | ............. | H04L 67/52 |
| 11,729,071 B1* | 8/2023 | Kolar | .................. | H04L 41/5009 |
| | | | | 709/224 |
| 11,776,273 B1* | 10/2023 | Chen | ...................... | G06V 20/49 |
| | | | | 382/224 |
| 11,882,046 B1* | 1/2024 | Wang | ...................... | H04L 41/12 |

(Continued)

FOREIGN PATENT DOCUMENTS

| | | |
|---|---|---|
| CN | 110809306 | 3/2021 |
| CN | 112561104 | 3/2021 |

(Continued)

OTHER PUBLICATIONS

Wang et al., "Delay-Aware Microservice Coordination in Mobile Edge Computing: A Reinforcement Learning Approach", IEEE Transactions on Mobile Computing, vol. 20, No. 3, doi: 10.1109/TMC.2019.2957804, Mar. 2021, 13 pages.

(Continued)

*Primary Examiner* — John A Follansbee
*Assistant Examiner* — Zonghua Du
(74) *Attorney, Agent, or Firm* — Aaron Pontikos; Andrew D. Wright; Calderon Safran & Wright P.C.

(57) ABSTRACT

A method includes: receiving, by a processor set, a request for a web-based service; generating, by the processor set, a feature vector including values based on parameters of the request; generating, by the processor set, an endpoint selection vector including plural probabilities corresponding to plural endpoints, wherein the endpoint selection vector is generated using the feature vector with a machine learning model; selecting, by the processor set, one of the plural endpoints based on the plural probabilities; and invoking, by the processor set, the selected endpoint.

16 Claims, 7 Drawing Sheets

(56) References Cited

U.S. PATENT DOCUMENTS

| | | | | |
|---|---|---|---|---|
| 2012/0014388 | A1* | 1/2012 | Shinohara | H04L 45/18 370/400 |
| 2020/0076842 | A1* | 3/2020 | Zhou | G06N 5/02 |
| 2020/0162391 | A1* | 5/2020 | Savalle | G06N 20/00 |
| 2020/0371851 | A1* | 11/2020 | Liu | G06F 8/62 |
| 2021/0035025 | A1* | 2/2021 | Kalluri | G06F 18/24137 |
| 2021/0055977 | A1* | 2/2021 | Lisuk | G06F 9/45558 |
| 2021/0256391 | A1* | 8/2021 | Karlinsky | G06V 10/82 |
| 2022/0030086 | A1 | 1/2022 | Meng et al. | |
| 2022/0093246 | A1* | 3/2022 | Karri | G16Y 10/75 |
| 2022/0245175 | A1* | 8/2022 | Hawco | G06F 16/221 |
| 2023/0031654 | A1* | 2/2023 | Pandey | H04L 43/028 |
| 2023/0206058 | A1* | 6/2023 | Wellmann | G06N 3/084 706/25 |
| 2024/0031292 | A1* | 1/2024 | Reddy | H04L 67/60 |

FOREIGN PATENT DOCUMENTS

| | | |
|---|---|---|
| CN | 112671865 | 4/2021 |
| CN | 112272353 | 9/2021 |
| CN | 114003387 | 2/2022 |
| CN | 112506657 | 4/2022 |
| WO | 2021208720 | 10/2021 |

OTHER PUBLICATIONS

Magableh et al., "A Deep Recurrent Q network towards Self-adapting Distributed Microservice architecture", Software: Practice and Experience 50.2, https://arxiv.org/pdf/1901.04011.pdf, 2020, 13 pages.

Fissaa et al., "An Intelligent Approach for Context-Aware Service Selection using Machine Learning", In Proceedings of the International Conference on Learning and Optimization Algorithms: Theory and Applications, https://dl.acm.org/doi/10.1145/3230905.3230938, 2018, 6 pages.

Ren et al., "A Reinforcement Learning Method for Constraint-Satisfied Services Composition", IEEE Transactions on Services Computing, vol. 13, No. 5, 2017, 15 pages.

Chandrakant, "Reinforcement Learning with Neural Network", Baeldung on Computer Science, https://www.baeldung.com/cs/author/kumar-chandrakant, Jun. 20, 2022, 21 pages.

Anonymous, "Reinforcement learning", Wikipedia, https://en.wikipedia.org/wiki/Reinforcement_learning, Sep. 13, 2022, 16 pages.

Anonymous, "Artificial neural network", Wikipedia, https://en.wikipedia.org/wiki/Artificial_neural_network, Sep. 13, 2022, 28 pages.

* cited by examiner

CONTINUOUSLY IMPROVING API SERVICE ENDPOINT SELECTIONS VIA ADAPTIVE REINFORCEMENT LEARNING

BACKGROUND

Aspects of the present invention relate generally to information technology (IT) service management and, more particularly, to continuously improving application program interface (API) service endpoint selections via adaptive reinforcement learning.

The use of enterprise microservices is growing rapidly. In a fabric of individually administered microservices, every API service request involves determining a qualified microservice endpoint to fulfill the request

SUMMARY

In a first aspect of the invention, there is a computer-implemented method including: receiving, by a processor set, a request for a web-based service; generating, by the processor set, a feature vector including values based on parameters of the request; generating, by the processor set, an endpoint selection vector including plural probabilities corresponding to plural endpoints, wherein the endpoint selection vector is generated using the feature vector with a machine learning model; selecting, by the processor set, one of the plural endpoints based on the plural probabilities; and invoking, by the processor set, the selected endpoint.

In another aspect of the invention, there is a computer program product including one or more computer readable storage media having program instructions collectively stored on the one or more computer readable storage media. The program instructions are executable to: train a deep learning model; receive a request for a web-based service; generate a feature vector including values based on parameters of the request; generate an endpoint selection vector including plural probabilities corresponding to plural endpoints, wherein the generating the endpoint selection vector comprises providing the feature vector as an input to the deep learning model; select one of the plural endpoints based on the plural probabilities; and invoke the selected endpoint.

In another aspect of the invention, there is system including a processor set, one or more computer readable storage media, and program instructions collectively stored on the one or more computer readable storage media. The program instructions are executable to: train a deep learning model; receive a request for a web-based service; generate a feature vector including values based on parameters of the request; generate an endpoint selection vector including plural probabilities corresponding to plural endpoints, wherein the generating the endpoint selection vector comprises providing the feature vector as an input to the deep learning model; select one of the plural endpoints based on the plural probabilities; and invoke the selected endpoint.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
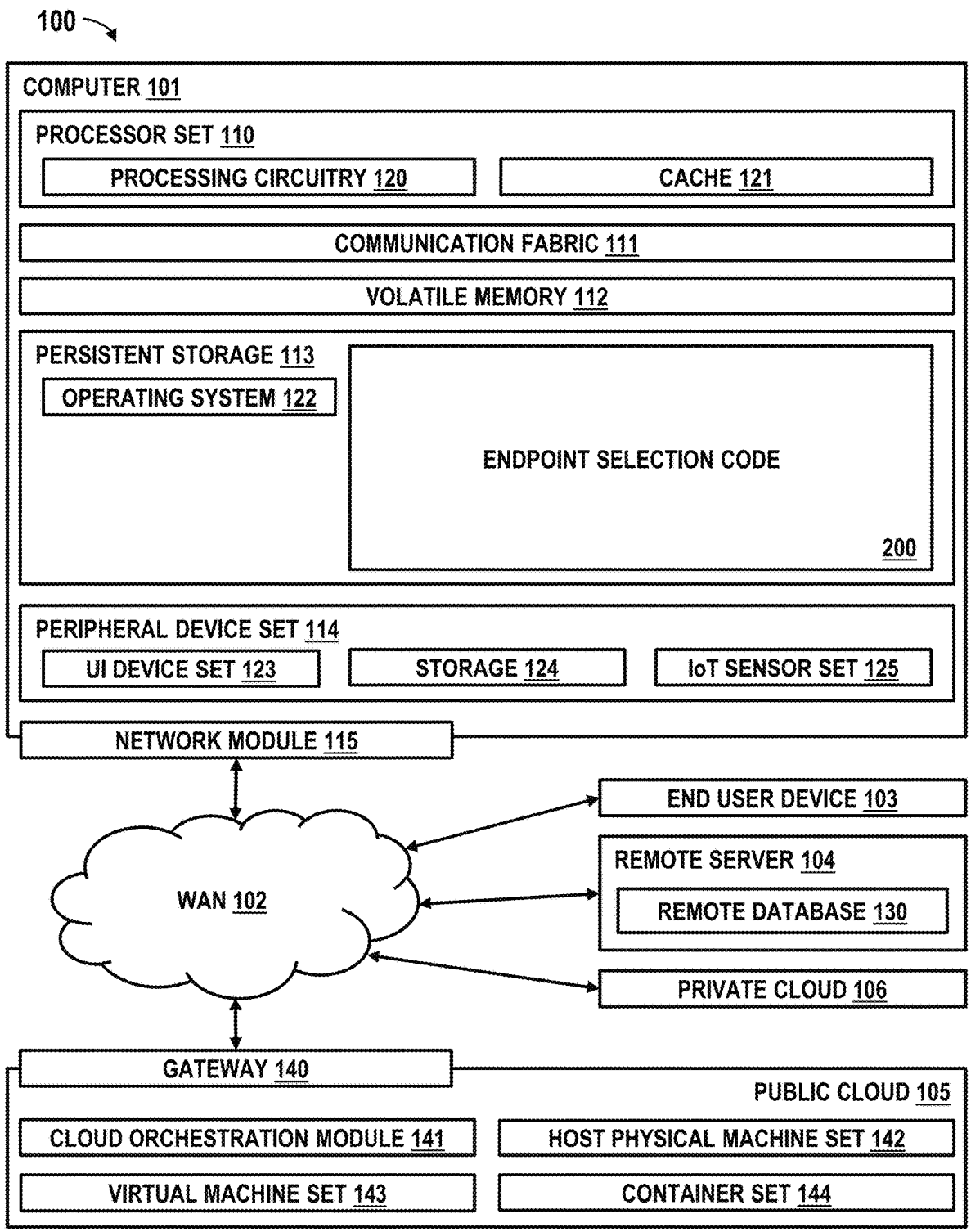
FIG. 1 depicts a computing environment according to an embodiment of the present invention.

Aspects of the present invention relate generally to information technology (IT) service management and, more particularly, to continuously improving application program interface (API) service endpoint selections via adaptive reinforcement learning. Implementations of the invention use a trained machine learning model to select one of plural different endpoints to handle a request for a web-based service. In embodiments, the machine learning model is trained using quality-of-experience (QoE) data associated with historical requests and endpoints. By training the model using adaptive reinforcement learning techniques and historical QoE data, implementations of the invention provide adaptive algorithms that make endpoint selection decisions with QoE assurance based on QoE history.

In a fabric of individually administered microservices, every API service request needs the infrastructure to determine a qualified microservice endpoint to fulfill the request. When the number of service requests, the number of microservice endpoints, and/or number of microservice endpoint changes are large (e.g., in a large hybrid multicloud environment), comparative quality-of-experience (QoE) evaluation results for endpoint selection decisions become unpredictable. Manually improving a procedural or rule-based adaptive algorithm in use becomes technically infeasible for the target dynamic microservices fabrics. Conventional techniques do not employ a learning-based approach to continuously improve microservice endpoint selections in terms of QoE assurance.

Implementations of the invention address the above-noted problems by providing adaptive algorithms that make endpoint selection decisions with QoE assurance based upon QoE history. For example, an implementation of the invention includes a method of continuously optimizing microservice endpoint selections via self-managed adaptive reinforcement learning, the method comprising: generating a feature vector for one or more microservice invocation requests; selecting the target microservice endpoint for each of the requests via the latest version of a decision-making model with the feature vector as input and with the quality-of-experience measures for the invocation saved as historical data; and training endpoint selection models with historical quality-of-experience measures of micro service invocations and the associated endpoints as input as well as with the training goals and rewards and penalties rules determined for each version-specific set of historical data.

In another example, an implementation of the invention includes a method of continuously improving API service endpoint selections via adaptive reinforcement learning, the method comprising: generating a feature vector for every API service invocation request; selecting the target API service endpoint for each request via the latest version of a decision-making model with the feature vector as input and with the quality-of-experience measures for the invocation saved as historical data; and training API service endpoint selection models with historical quality-of-experience measures of API service invocations and the associated API service endpoints as input as well as with the training goals and rewards and penalties rules determined for each version-specific set of historical data.

In another example, an implementation of the invention includes a method of continuously optimizing microservice endpoint selections via self-managed adaptive reinforcement learning, the method comprising: generating a feature vector for every microservice invocation request and selecting the target microservice endpoint for each request via the latest version of a decision-making model with the feature vector as input and with the quality-of-experience measures for the invocation saved as historical data; and self-managing a versioned reinforcement learning process for training endpoint selection models with historical quality-of-experience measures of microservice invocations and the associated endpoints as input as well as with the training goals and rewards and penalties rules determined for each version-specific set of historical data.

These and other implementations of the invention provide a practical application of handling a request for a web-based service, such as an API call (e.g. using a REST API) or a web service call (e.g., using a SOAP message). In embodiments, the handling includes receiving a request for a web-based service from a client computing device, selecting one of plural endpoints to handle the request, sending the request to the selected endpoint, receiving a response to the request from the selected endpoint, and sending the response to the client computing device that initiated the request. Implementations of the invention provide an improvement over conventional web-based service endpoint selection techniques by using a trained machine learning model (e.g., a deep learning model) to make the endpoint selection, where the machine learning model is trained using quality-of-experience (QoE) data associated with historical requests and endpoints. By training the model using adaptive reinforcement learning techniques and historical QoE data, implementations of the invention provide adaptive algorithms that make endpoint selection decisions with QoE assurance based on QoE history.

Implementations of the invention are necessarily rooted in computer technology. For example, the steps of training a machine learning model, receiving a request for a web-based service (e.g., an API call or a web service call) from a client computing device, using the machine learning model to make an endpoint selection for the request, invoking the endpoint to handle the request, and returning the response to the client computing device are all computer-based and cannot be performed in the human mind. For example, training and using a machine learning model are, by definition, performed by a computer and cannot practically be performed in the human mind (or with pen and paper) due to the complexity and massive amounts of calculations involved. For example, a neural network may have millions or even billions of weights that represent connections between nodes in different layers of the model. Values of these weights are adjusted, e.g., via backpropagation and stochastic gradient descent, when training the model and are utilized in calculations when using the trained model to generate an output in real time (or near real time). Given this scale and complexity, it is simply not possible for the human mind, or for a person using pen and paper, to perform the number of calculations involved in training and/or using a machine learning model. Further, requests for web-based services (e.g., an API call or a web service call) and handling those requests using a network endpoint are concepts that exist only in networked computing environments, and do not have a pre-Internet analog.

It should be understood that, to the extent implementations of the invention collect, store, or employ personal information provided by or obtained from individuals, such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as endpoint selection code at block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
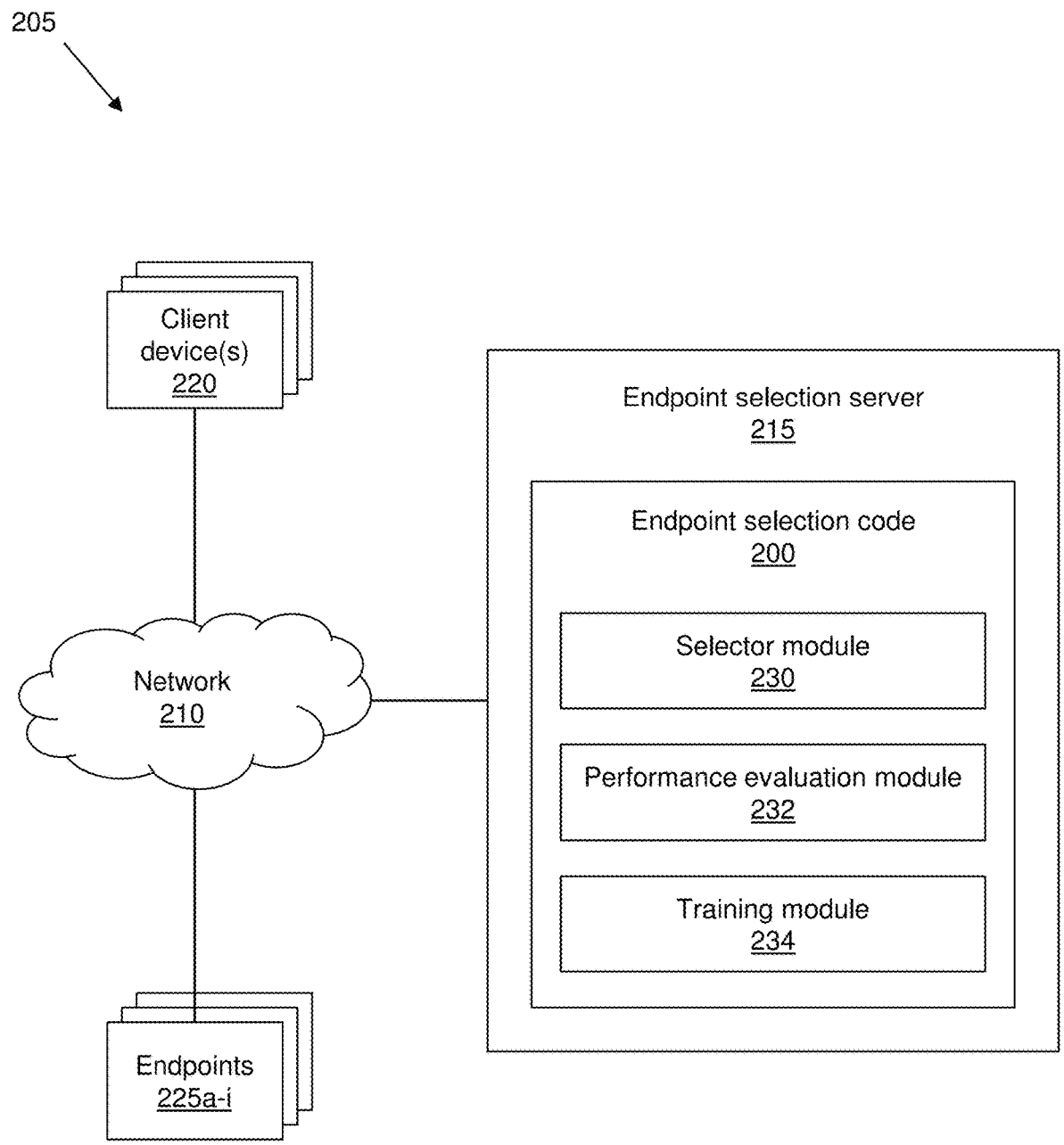
FIG. 2 shows a block diagram of an exemplary environment in accordance with aspects of the invention.

FIG. 2 shows a block diagram of an exemplary environment 205 in accordance with aspects of the invention. In embodiments, the environment 205 includes a network 210 providing communication between an endpoint selection server 215, one or more client devices 220, and a plural different endpoints 225a-i.

The client devices 220 may comprise computing devices such as a laptop computer, desktop computer, tablet computer, smartphone, etc. In an exemplary implementation, each of the client devices 220 comprises an instance of end user device 103 of FIG. 1.

The network 210 may comprise any one or more communication networks such as a LAN, WAN, and the Internet, and combinations thereof. In an exemplary implementation, the network 210 comprises WAN 102 of FIG. 1.

According to aspects of the invention, the endpoints 225a-i comprise plural different network endpoints that let the client devices 220 access web-based services via the network 210. Individual ones of the endpoints 225a-i may comprise an API endpoint or a web service endpoint. An API endpoint may comprise a Uniform Resource Locator (URL) used to access an API. An API may be associated with resources located at servers (such as remote server(s) 104 of FIG. 1), and an API endpoint may be used to specify the location of the resource. Non-limiting examples of APIs include: a social media network API that permits users to post content to their social media account in the social media network; a news provider API that permits users to access content such as articles and streaming video; a cognitive computing API that receives a request, performs a cognitive computing task based on the request, and returns a result of the cognitive computing task. In this manner, the endpoints 225a-i maybe used by the client devices 220 to access resources at remote servers.

In a large hybrid multicloud environment, there may be a very large number of endpoints 225a-i, and plural respective ones of the endpoints 225a-i may provide access to a same web-based service (e.g., resource). In such a situation, a broker may receive a request from a client device 220 and select which one of the plural respective ones of the endpoints 225a-i to which to direct the request. According to aspects of the invention, the endpoint selection server 215 functions as such a broker and makes an endpoint selection using a machine learning model that is trained using adaptive reinforcement learning and historic QoE data.

In accordance with aspects of the invention, the endpoint selection server 215 comprises endpoint selection code 200 that is configured to perform processes described herein, including but not limited to: train a machine learning model; receive a request for a web-based service; generate a feature vector including values based on parameters of the request; generate an endpoint selection vector including plural probabilities corresponding to plural endpoints, wherein the generating the endpoint selection vector comprises providing the feature vector as an input to the machine learning model; select one of the plural endpoints based on the plural probabilities; and invoke the selected endpoint with the request. In one example, the endpoint selection server 215 is one or more computing devices each including one or more elements of the computer 101 of FIG. 1. In another example, the endpoint selection server 215 is one or more virtual machines (VMs) or containers running on one or more computing devices. In embodiments, the endpoint selection code 200 comprises computer code (e.g., such as code represented by block 200 of FIG. 1) running on the endpoint selection server 215.

In embodiments, the endpoint selection server 215 of FIG. 2 comprises selector module 230, performance evaluation module 232, and training module 234, each of which may comprise modules of the code of endpoint selection code 200. In embodiments, these modules of the endpoint selection code 200 are executable by the processing circuitry 120 of FIG. 1 to perform the inventive methods as described herein. The endpoint selection server 215 may include additional or fewer modules than those shown in FIG. 2. In embodiments, separate modules may be integrated into a single module. Additionally, or alternatively, a single module may be implemented as multiple modules. Moreover, the quantity of devices and/or networks in the environment is not limited to what is shown in FIG. 2. In practice, the environment may include additional devices and/or networks; fewer devices and/or networks; different devices and/or networks; or differently arranged devices and/or networks than illustrated in FIG. 2.

In accordance with aspects of the disclosure, the selector module 230 is configured to select one of the endpoints 225a-i for handling a request. In embodiments, the selector module 230 receives a request, generates a feature vector including parameters of the request, and provides the feature vector as an input to a trained machine learning model. In embodiments, the output of the machine learning model is a probabilistic endpoint selection vector that includes plural probabilities corresponding to plural ones of the endpoints 225a-i. In embodiments, the selector module 230 selects one of the plural ones of the endpoints 225a-i (represented by the probabilities in the probabilistic endpoint selection vector) by generating a random number, comparing the random number to the probabilities in the probabilistic endpoint selection vector, and selecting one of the endpoints 225a-i based on the random number matching a probability range associated with the one of the endpoints. In embodiments, the selector module 230 invokes the selected one of the endpoints 225a-i by sending the request to the selected endpoint, e.g., via the network 210. The selector module 230 may operate offline during a training phase and may operate online to make real-time endpoint selections during an action phase.

In accordance with aspects of the disclosure, the performance evaluation module 232 is configured to determine loss values used in training the machine learning model during the training phase. In embodiments, a loss value comprises a difference between a first expected reward generated by the machine learning model and a second expected reward derived from log data (e.g., historic data). In one example, the expected reward derived from log data comprises a value that represents a quality-of-experience for a pair comprising a particular request feature vector and a particular endpoint.

In accordance with aspects of the disclosure, the training module 234 is configured to train the machine learning model used by the selector module 230. In embodiments, the machine learning model comprises a deep learning model such as a neural network. In embodiments, the machine learning model is trained using reinforcement learning action-value training using the loss values determined by the performance evaluation module 232. In embodiments, the training module 234 trains the machine learning model in the offline training phase, and provides the trained machine learning model to the selector module 230 for use in making real-time endpoint selections during the online action phase. In embodiments, after initially training the machine learning model, the training module 234 continuously updates the machine learning model as new training data becomes available from real-time endpoint selections made during the online action phase. In this manner, updated versions of the model are provided, and the endpoint selection code continuously improves the selections made by the selector module 230 via adaptive learning.

Figure 3:
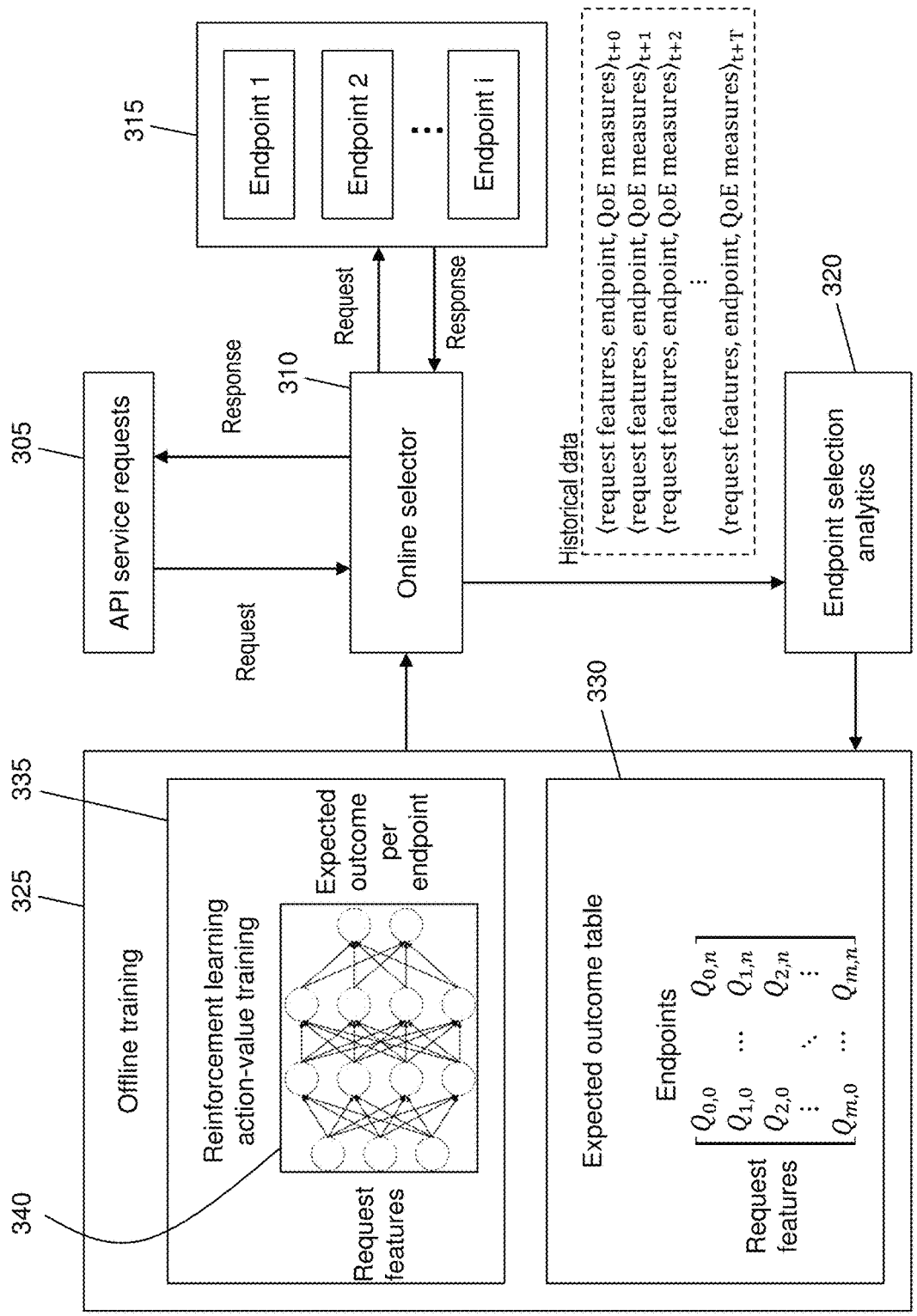
FIG. 3 shows a diagrammatic overview of a system in accordance with aspects of the invention.

FIG. 3 shows a diagrammatic overview of a system in accordance with aspects of the invention. Processes described with respect to FIG. 3 may be carried out in the environment of FIG. 2 and are described with reference to elements depicted in FIG. 2.

Block 305 represents API service requests generated by client devices 220 of FIG. 2. In this example, in the action phase, a request generated at block 305 is received by online selector 310, the functions of which may be performed by selector module 230 of FIG. 2. In this example, the online selector 310 generates a feature vector that includes parameters of the request. Parameters may be determined from metadata included in the request and may include, but are not limited to, request type, subscription identification, and catalog identification. After generating the feature vector for this request, the online selector 310 generates an endpoint selection vector by inputting the feature vector into the current version of the machine learning model (obtained from block 325). In this example, the output of the machine learning model is the endpoint selection vector, which is a one-dimensional vector containing determined probabilities that are mapped to various ones of the endpoints (represented at block 315) that are deemed capable of handling the request. In this example, the online selector 310 selects one of the endpoints represented by the endpoint selection vector by comparing a randomly generated number to ranges defined by the probabilities in the endpoint selection vector. In this example, the online selector 310 invokes the selected endpoint by sending the request to the selected endpoint (e.g., via the network 210 of FIG. 2). The selected endpoint processes the request and returns a response to the online selector 310, which transmits the response to the client device that made the request at block 305. In this manner, the online selector 310 uses the current version of the trained machine learning model to make a real-time selection of one of plural endpoints to handle the request for the client device.

Still referring to FIG. 3, block 320 represents endpoint selection analytics, which may be performed by performance evaluation module 232 of FIG. 2. In this example, the endpoint selection analytics comprises obtaining historical data for each request handled by the online selector 310. The historical data for a handled request may include the request features (e.g., as defined in the feature vector), data defining the selected endpoint that handled the request, and QoE measures. In this example, QoE measures may include but are not limited to: error messages returned during handling the request and time spent handling the request. In this example, the endpoint selection analytics comprises generating a QoE value for a request using the QoE measures and a predefined scoring algorithm.

With continued reference to FIG. 3, block 325 represents offline training of the machine learning model, which may be performed by the training module 234 of FIG. 2. In this example, the offline training utilizes an expected outcome table shown at 330 and reinforcement learning shown at 335. In this example, the expected outcome table 330 comprises a table of QoE values corresponding to unique pairs of request features and endpoints. In embodiments, each row of the table 330 corresponds to a unique set of request features (0, 1, . . . , m) and each column of the table 330 corresponds to a unique endpoint (0, 1, . . . , n). In embodiments, each entry in the table 330 is an average of plural historical QoE values determined for the particular pair of request features and endpoint. For example, $Q_{0,0}$ may be an average of plural QoE values previously determined for different requests that had a same feature vector and that were handled by a same endpoint. In embodiments, the QoE values in the table 330 are used as the expected reward derived from log data, used by the performance evaluation module 232 when determining loss values during the training phase, as described herein.

Continuing the example of FIG. 3, as shown at block 335, the offline training uses reinforcement learning action-value training to train a machine learning model 340. In embodiments, the machine learning model 340 comprises a neural network that receives a feature vector as an input and that generates an expected outcome per endpoint as an output. In this example, the action of the action-value training corresponds to an endpoint and the value of the action-value training corresponds to the expected reward for the endpoint.

Figure 4:
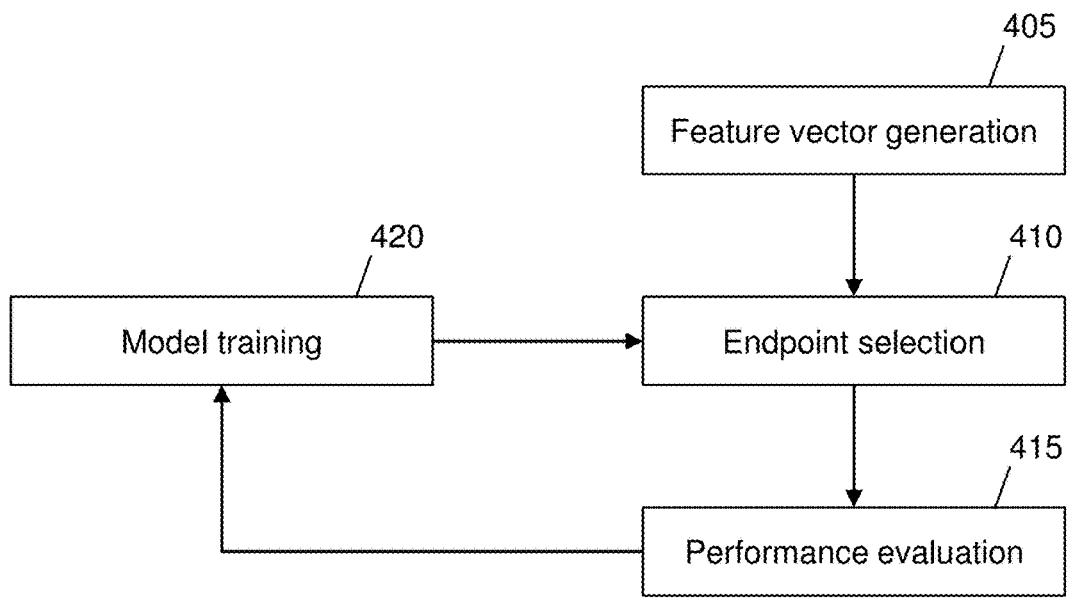
FIG. 4 shows a block diagram of a training phase in accordance with aspects of the invention.

FIG. 4 shows a block diagram of a training phase in accordance with aspects of the invention. Processes described with respect to FIG. 4 may be carried out in the environment of FIG. 2 and the system of FIG. 3 and are described with reference to elements depicted in FIGS. 2 and 3.

Block 405 represents feature vector generation. In embodiments, the endpoint selection code 200 generates a stream of normalized feature vectors, each of which is associated with one logged request used for training the current version of the machine learning model. In embodiments, each feature vector includes parameters of a respective logged request. As described herein, parameters may include request type, subscription identification, and catalog identification, for example.

Block 410 represents endpoint selection using each of the feature vectors generated at block 405. In embodiments, the selector module 230 generates a stream of probabilistic endpoint selection vectors. Each respective one of the endpoint selection vectors is generated by inputting one of the feature vectors into the current version of the machine learning model.

Block 415 represents performance evaluation for each of the endpoint selection vectors generated at block 410. In embodiments, the performance evaluation module 232 determines a loss value for each candidate endpoint in a particular one of the endpoint selection vectors. In embodiments, for a particular candidate endpoint represented an endpoint selection vector, the loss value is the difference between a selector-generated expected reward for the candidate endpoint and a log-derived expected reward for the candidate endpoint. In this example, the selector-generated expected reward for the candidate endpoint is the probability value in the endpoint selection vector for this candidate endpoint. In this example, the log-derived expected reward for the candidate endpoint is the QoE value in table 330 (of FIG. 3) defined for this particular endpoint and for the feature vector for this request.

Block 420 represents training the machine learning model using the loss values determined at block 415. In embodiments, the training module 234 trains the machine learning model using the loss values and the reinforcement learning action-value training described at block 335 of FIG. 3. In this manner, the system trains a machine learning model using historic data (e.g., data from logged requests and historic QoE values).

Figure 5:
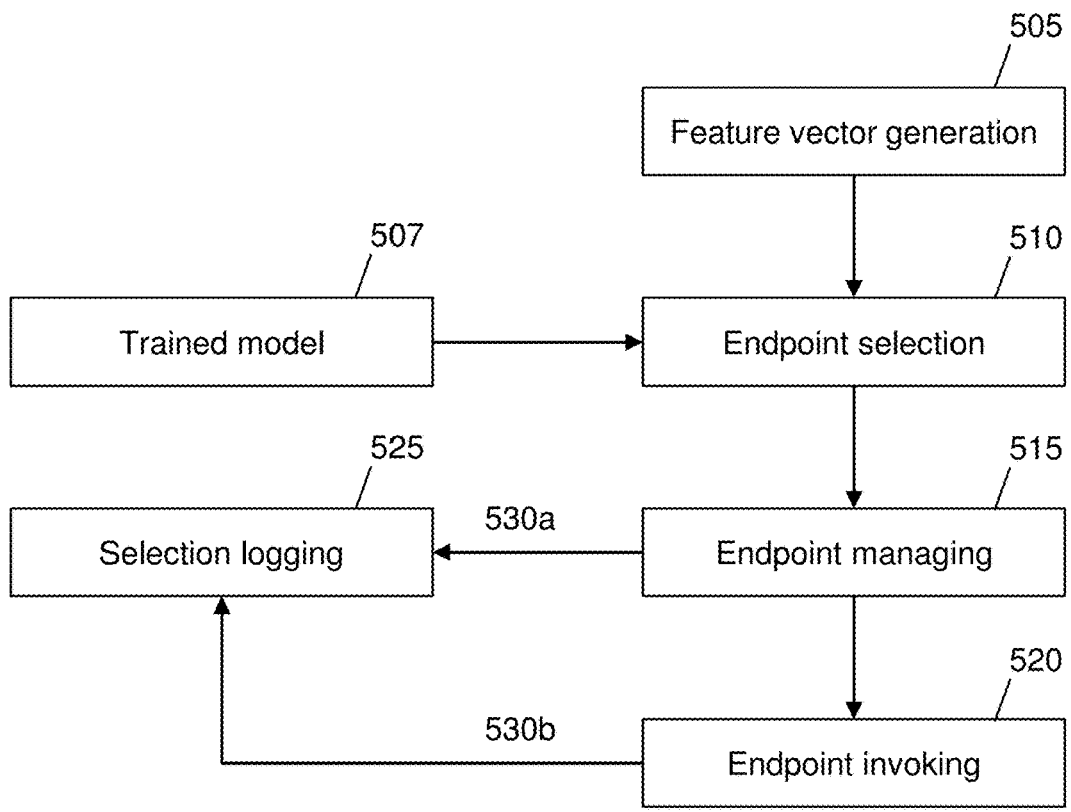
FIG. 5 shows a block diagram of an action phase in accordance with aspects of the invention.

FIG. 5 shows a block diagram of an action phase in accordance with aspects of the invention. Processes described with respect to FIG. 5 may be carried out in the environment of FIG. 2 and the system of FIG. 3 and are described with reference to elements depicted in FIGS. 2 and 3.

Block 505 represents feature vector generation. In embodiments, the endpoint selection code 200 generates a feature vector for an incoming request (e.g., a real-time request for a web-based service received from a client device 220). In embodiments, the feature vector includes parameters of the incoming request. As described herein, parameters may include request type, subscription identification, and catalog identification, for example.

Block 510 represents endpoint selection using the feature vector generated at block 505. In embodiments, the selector module 230 generates a probabilistic endpoint selection vector by inputting the feature vector into the current version of the machine learning model, which is represented by block 507. As described herein, the output of the model is the endpoint selection vector, which in embodiments is a one-dimensional vector containing determined probabilities that are mapped to various ones of the endpoints that are deemed capable of handling the request from block 505.

Block 515 represents endpoint managing using the endpoint selection vector generated at block 510. In embodiments, the selector module 230 selects one of the endpoints associated with one of the probability values included in the endpoint selection vector. In embodiments, the selector module 230 defines ranges of probabilities between a minimum value (e.g., 0) and a maximum value (e.g., 1), the ranges being delineated by the probability values included in the endpoint selection vector. In embodiments, the selector module 230 generates a random number between the minimum and maximum values (e.g., between 0 and 1) and compares the random number to the ranges of probabilities. Based on this comparing, the selector module 230 selects the endpoint associated with the probability whose range the random number fell within.

Block 520 represents endpoint invoking. In embodiments, the selector module 230 invokes the endpoint selected at block 515 by sending the request to the selected endpoint. This may include, for example, sending the request to a URL defined by the selected endpoint. As described herein, the service associated with the endpoint handles the request and returns a response to the selector module 230, which passes the response to the client device 220 that initiated the request.

Block 525 represents selection logging performed by endpoint selection code 200. At step 530a, the selector module 230 sends data to the performance evaluation module 232, which may also serve as an endpoint selection logger. In embodiments, the data in this step defines the feature vector of the request (from block 505) and the selected endpoint (from block 515).

At step 530b, and after invoking the selected endpoint, the selector module 230 sends QoE data to the performance evaluation module 232. In embodiments, the data in this step comprises a QoE value that represents how well the selected endpoint handled the request. As described herein, the QoE value may be determined using QoE measures associated with handling the request (e.g., error messages, time spent, etc.) and a predefined scoring algorithm.

Figure 6:
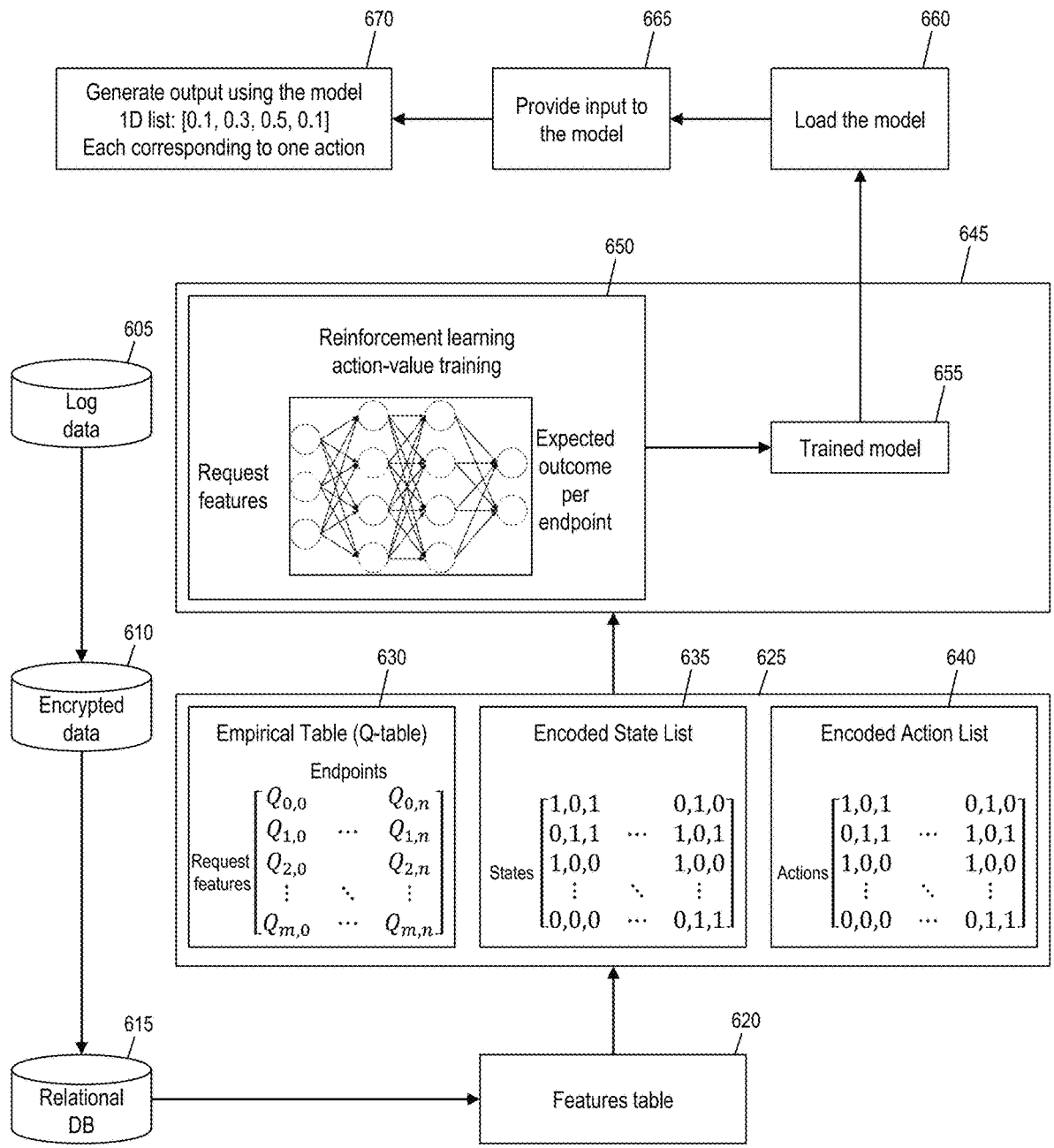
FIG. 6 shows a block diagram of an exemplary implementation in accordance with aspects of the invention.

FIG. 6 shows a block diagram of an exemplary implementation in accordance with aspects of the invention. Block 605 represents stored log data of plural historic requests. Optionally, at block 610, the log data may be encrypted. Block 615 represents the log data stored in a relational database. In embodiments, each row in the database corresponds to a feature vector for a particular request.

With continued reference to FIG. 6, block 620 represents a features table. In embodiments, the features table is a one-hot-encoded features table that includes data in the form of: columns from the database; a state that combines all feature binaries; actions corresponding to endpoint encodings; and rewards corresponding to calculated rewards. Block 625 represents internal data including an empirical table 630, an encoded state list 635, and an encoded action list 640. Block 645 represents a model training phase including training the current version of the machine learning model at step 650 and saving the current version of the machine learning model at block 655. In one example, the training at block 650 corresponds to the training at block 335 of FIG. 3, and the trained model at block 655 corresponds to the model 340 of FIG. 3.

Still referring to FIG. 6, block 660 represents loading the current version of the machine learning model. Block 665 represents providing an input to the loaded current version of the machine learning model. Block 670 represents an output generated by the machine learning model in response to the input at block 665. In one example, the selector module 230 preforms the functions at blocks 660, 665, 670, with the output at block 670 corresponding to the endpoint selection vector for a particular request.

Figure 7:
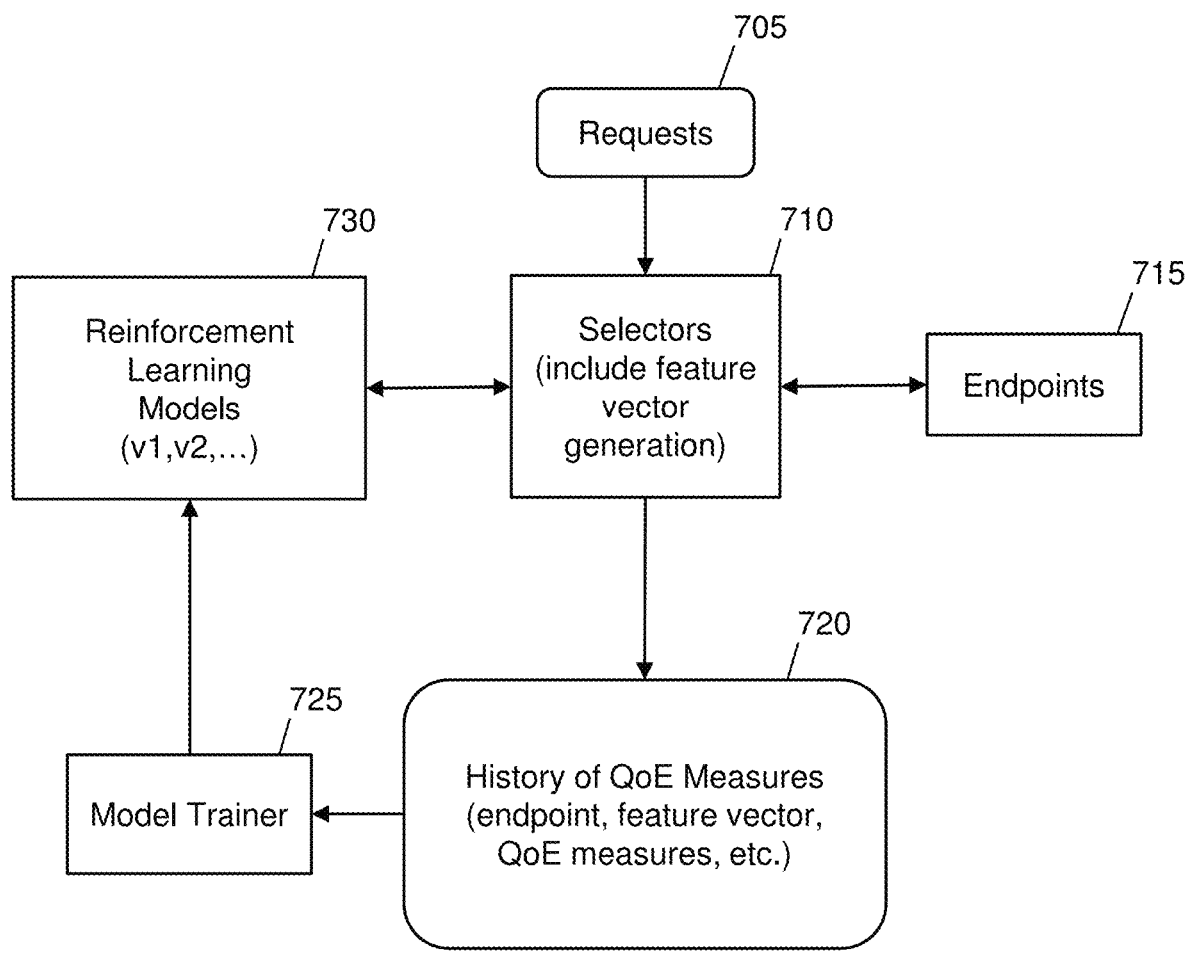
FIG. 7 shows a block diagram of an exemplary implementation in accordance with aspects of the invention.

FIG. 7 shows a block diagram of an exemplary implementation in accordance with aspects of the invention. Block 705 represents requests for web-based services similar to block 305 of FIG. 3. Block 710 represents a selector that includes feature vector generation, endpoint selection vector generation, and endpoint selection, similar to block 310 of FIG. 3. Block 715 represents plural endpoints (e.g., API endpoints, microservice endpoints, etc.) similar to block 315 of FIG. 3. Block 720 represents historical data in the form of a history of QoE measures for each request, including: the endpoint selected for the request, the feature vector of the request, and QoE measures of the handling of the request by the selected endpoint. Block 725 represents the model trainer similar to block 325 of FIG. 3. Block 730 represents versions of the trained machine learning models, a current version being the model used at block 710 to generate an endpoint selection vector. In embodiments, the models at block 730 are reinforcement learning models.

In embodiments, and with continued reference to FIG. 7, the selector at block 710 uses the latest (i.e., current) trained reinforcement learning model from block 730 to make an endpoint selection (from endpoints at block 715) based on the feature set of the input request from block 705. The selector at block 710 may comprise the selector module 230 of FIG. 2.

In embodiments, and still referring to FIG. 7, the model trainer at block 725 receives input in the form of the historical QoE data and uses a window-based approach to select data in a recent time period as training data. In this example, the output of the model trainer at block 725 is a reinforcement learning based model used for endpoint selection. In embodiments, the model trainer at block 725 trains the model according to the algorithm: (1) use each record within the dataset as one episode; (2) obtain baseline QoE metrics by calculating a median over all training data within a current window, where this metric will be used for calculating a reward for each episode trial; (3) iterate through all records within the training set using reinforcement learning model training techniques in the concept of an episode; for each episode, consider the feature set as the current state, consider the selected endpoint as the action taken, and compare the QoE measures with the baseline metric to calculate the loss for the current episode (e.g., loss calculated in terms of difference between baseline QoE and current QoE); after step 4, deploy the trained model to the selector. In embodiments, the model trainer at block 725 runs as a service for continuous model updating. This updating (i.e., training) event can occur every "T" time units, where T can be treated as one of the tuning parameters determined during actual deployment.

Figure 8:
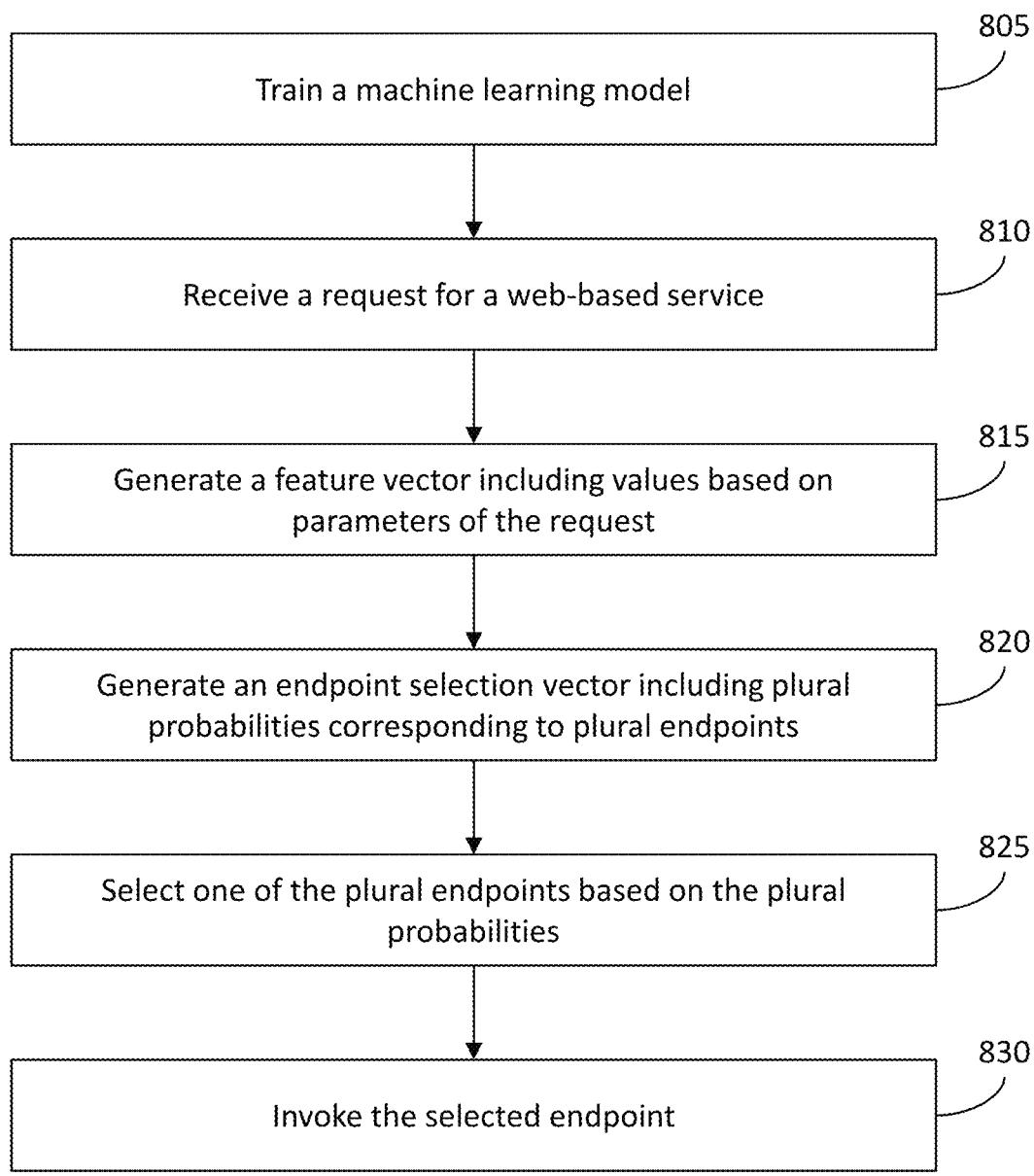
FIG. 8 shows a flowchart of an exemplary method in accordance with aspects of the invention.

FIG. 8 shows a flowchart of an exemplary method in accordance with aspects of the present invention. Steps of the method may be carried out in the environment of FIG. 2 and are described with reference to elements depicted in FIG. 2.

At step 805, the system trains a machine learning model. In embodiments, and as described herein, the training module 234 trains a machine learning model. The training may be performed in the manner described at any of FIGS. 2-7. The model may comprise a deep learning model such as a neural network. In a particular example, the model comprises a reinforcement learning model trained using action-value training.

At step 810, the system receives a request for a web-based service. In embodiments, and as described herein, the selector module 230 receives a request from a client computing device 220, the request being for a web-based service. The request may be an API request or a webservices request, for example.

At step 815, the system generates a feature vector that includes values based on parameters of the request that was received at step 810. In embodiments, and as described herein, the selector module 230 generates the feature vector. Parameters may be determined from metadata included in the request and may include request type, subscription identification, and catalog identification, for example.

At step 820, the system generates an endpoint selection vector including plural probabilities corresponding to plural endpoints. In embodiments, and as described herein, the selector module 230 generates the endpoint selection vector by inputting the feature vector from step 815 into the current version of the trained model from step 805.

At step 825, the system selects one of the plural endpoints based on the plural probabilities included in the endpoint selection vector from step 820. In embodiments, and as described herein, the selector module 230 compares a random number to ranges defined by the probabilities included in the endpoint selection vector and selects one of the endpoints based on this comparison.

At step 830, the system selects one of the plural endpoints based on the plural probabilities included in the endpoint selection vector from step 820. In embodiments, and as described herein, the selector module 230 sends the request to the selected endpoint, receives a response from the endpoint, and passes the response to the client device 220 that made the request at step 810.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer 101 of FIG. 1, can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer 101 of FIG. 1, from a computer readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
receiving, by a processor set, a request for a web-based service;
generating, by the processor set, a feature vector including values based on parameters of the request;
generating, by the processor set, an endpoint selection vector including plural probabilities corresponding to plural endpoints, wherein the endpoint selection vector is generated using the feature vector with a machine learning model;
selecting, by the processor set, one of the plural endpoints based on a random number and the plural probabilities;
invoking, by the processor set, the selected endpoint;
in response to the selecting one of the plural endpoints, providing data defining the selected one of the plural endpoints to an endpoint selection logger; and
in response to the invoking the selected endpoint, providing quality-of-experience data to the endpoint selection logger, wherein the quality-of-experience data comprises data that quantifies a quality-of-experience associated with the selected endpoint handling the request.

2. The method of claim 1, wherein the selected endpoint comprises one of an application program interface (API) endpoint and a web service endpoint.

3. The method of claim 1, wherein the machine learning model comprises a deep learning model.

4. The method of claim 3, wherein the deep learning model comprises a neural network.

5. The method of claim 1, wherein the generating the endpoint selection vector comprises:
inputting the feature vector to the machine learning model; and
receiving the endpoint selection vector as an output of the machine learning model.

6. The method of claim 1, wherein the selecting one of the plural endpoints comprises:
generating the random number;
comparing the random number to the plural probabilities; and
in response to the comparing, selecting the one of the plural endpoints based on the random number matching a probability range associated with the one of the plural endpoints.

7. The method of claim 1, further comprising training the machine learning model.

8. The method of claim 7, wherein the training the machine learning model comprises:
generating a stream of normalized feature vectors, wherein each respective one of the normalized feature vectors is associated with a respective one of plural logged requests;
generating a stream of probabilistic endpoint selection vectors;

determining loss values comprising a respective loss value for each one of the probabilistic endpoint selection vectors;

training the machine learning model using the loss values.

9. The method of claim 8, wherein the respective loss value for one of the probabilistic endpoint selection vectors comprises a difference between an expected reward generated by the machine learning model and an expected reward derived from log data.

10. The method of claim 9, wherein the expected reward derived from log data comprises a value that represents a quality-of-experience for a pair comprising a particular request feature vector and a particular endpoint.

11. A computer program product comprising one or more computer readable storage media having program instructions collectively stored on the one or more computer readable storage media, the program instructions executable to:

receive a request for a web-based service;

generate a feature vector including values based on parameters of the request;

generate an endpoint selection vector including plural probabilities corresponding to plural endpoints, wherein the generating the endpoint selection vector comprises providing the feature vector as an input to a deep learning model;

select one of the plural endpoints based on a random number and the plural probabilities; and invoke the selected endpoint, wherein training the deep learning model comprises:

generating a stream of normalized feature vectors, wherein each respective one of the normalized feature vectors is associated with a respective one of plural logged requests;

generating a stream of probabilistic endpoint selection vectors;

determining loss values comprising a respective loss value for each one of the probabilistic endpoint selection vectors;

training the deep learning model using the loss values; and wherein the respective loss value for one of the probabilistic endpoint selection vectors comprises a difference between an expected reward generated by the machine learning model and an expected reward derived from log data.

12. The computer program product of claim 11, wherein the selecting one of the plural endpoints comprises:

generating the random number;

comparing the random number to the plural probabilities; and in response to the comparing, selecting the one of the plural endpoints based on the random number matching a probability range associated with the one of the plural endpoints.

13. The computer program product of claim 11, wherein the expected reward derived from log data comprises a value that represents a quality-of-experience for a pair comprising a particular request feature vector and a particular endpoint.

14. The computer program product of claim 11, wherein the program instructions are executable to:

in response to the selecting one of the plural endpoints, provide data defining the selected one of the plural endpoints to an endpoint selection logger; and in response to the invoking the selected endpoint, provide quality-of-experience data to the endpoint selection logger, wherein the quality-of-experience data comprises data that quantifies a quality-of-experience associated with the selected endpoint handling the request.

15. A system comprising:

a processor set, one or more computer readable storage media, and program instructions collectively stored on the one or more computer readable storage media, the program instructions executable to:

receive a request for a web-based service;

generate a feature vector including values based on parameters of the request;

generate an endpoint selection vector including plural probabilities corresponding to plural endpoints, wherein the generating the endpoint selection vector comprises providing the feature vector as an input to a deep learning model;

select one of the plural endpoints based on a random number and the plural probabilities; and invoke the selected endpoint, wherein the selecting one of the plural endpoints comprises:

generating the random number;

comparing the random number to the plural probabilities; and in response to the comparing, selecting the one of the plural endpoints based on the random number matching a probability range associated with the one of the plural endpoints.

16. The system of claim 15, wherein training the deep learning model comprises:

generating a stream of normalized feature vectors, wherein each respective one of the normalized feature vectors is associated with a respective one of plural logged requests;

generating a stream of probabilistic endpoint selection vectors;

determining loss values comprising a respective loss value for each one of the probabilistic endpoint selection vectors, wherein the respective loss values are based on expected rewards;

training the deep learning model using the loss values.

* * * * *